United States Patent

[11] 3,582,133

| [72] | Inventor | Hubert Y. DeLavenne<br>Meudon Bellevue, France |
|---|---|---|
| [21] | Appl. No. | 747,999 |
| [22] | Filed | July 26, 1968 |
| [45] | Patented | June 1, 1971 |
| [73] | Assignees | Automobiles Peugeot<br>Paris, France;<br>Regie Nationale Des Usines Renault<br>Billoncourt, France |
| [32] | Priority | July 31, 1967, Oct. 17, 1967, Apr. 18, 1968 |
| [33] | | France |
| [31] | | 116,271, 124,657 and 148,463 |

[54] ENERGY ABSORBING ARRANGEMENT FOR SEAT ON A VEHICLE
19 Claims, 14 Drawing Figs.

[52] U.S. Cl. .................................................. 296/65,
188/1, 297/216
[51] Int. Cl. ........................................... B60r 21/02
[50] Field of Search ........................................ 296/65,
65.1; 297/216; 248/400; 188/1 C

[56] References Cited
UNITED STATES PATENTS

| 2,227,717 | 1/1941 | Jones | 296/65(.1) |
| 2,682,931 | 6/1954 | Young | 297/216X |
| 2,933,127 | 4/1960 | Brewster | 297/216 |
| 2,959,207 | 11/1960 | Brewster | 297/216 |
| 3,361,475 | 1/1968 | Villiers | 188/1(C) |

*Primary Examiner*—Benjamin Hersh
*Assistant Examiner*—John A. Pekar
*Attorney*—Burnes, Doane, Swecker & Mathis ABSTRACT: Arrangement of a seat on a vehicle adapted to allow the seat to absorb energy upon impact on the vehicle. The seat is pivoted to floor of vehicle and a deformable energy absorbing device connects the seat to the floor. This device is so adapted as to avoid restoring energy after having absorbed energy upon impact on the vehicle so that the passenger on the seat is not thrown back subsequent to absorption of the energy.

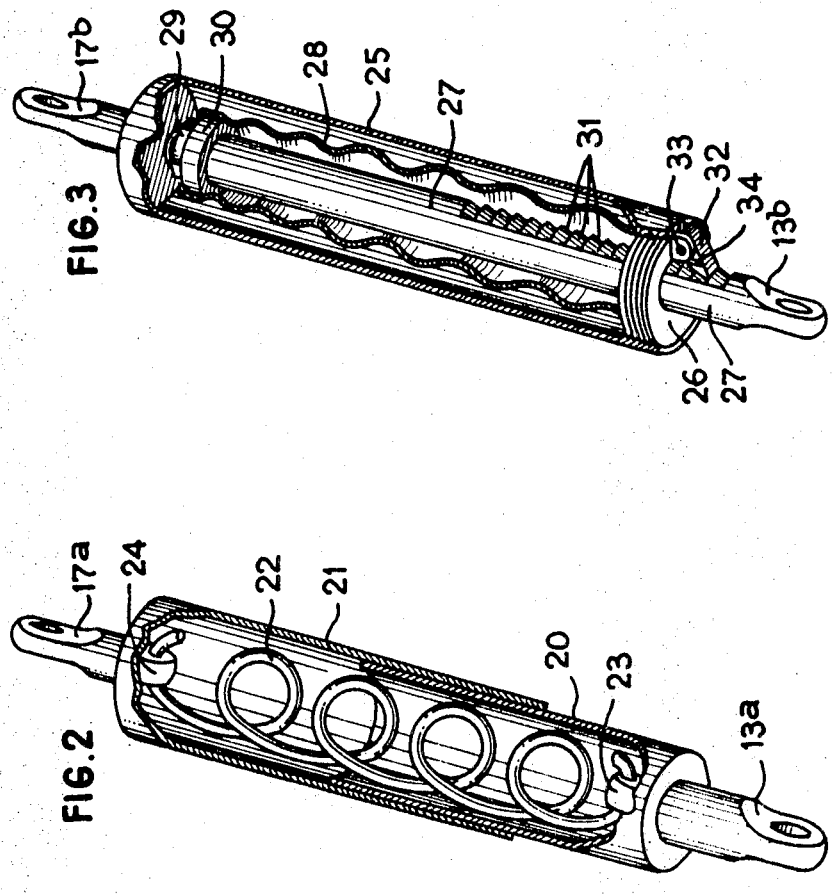

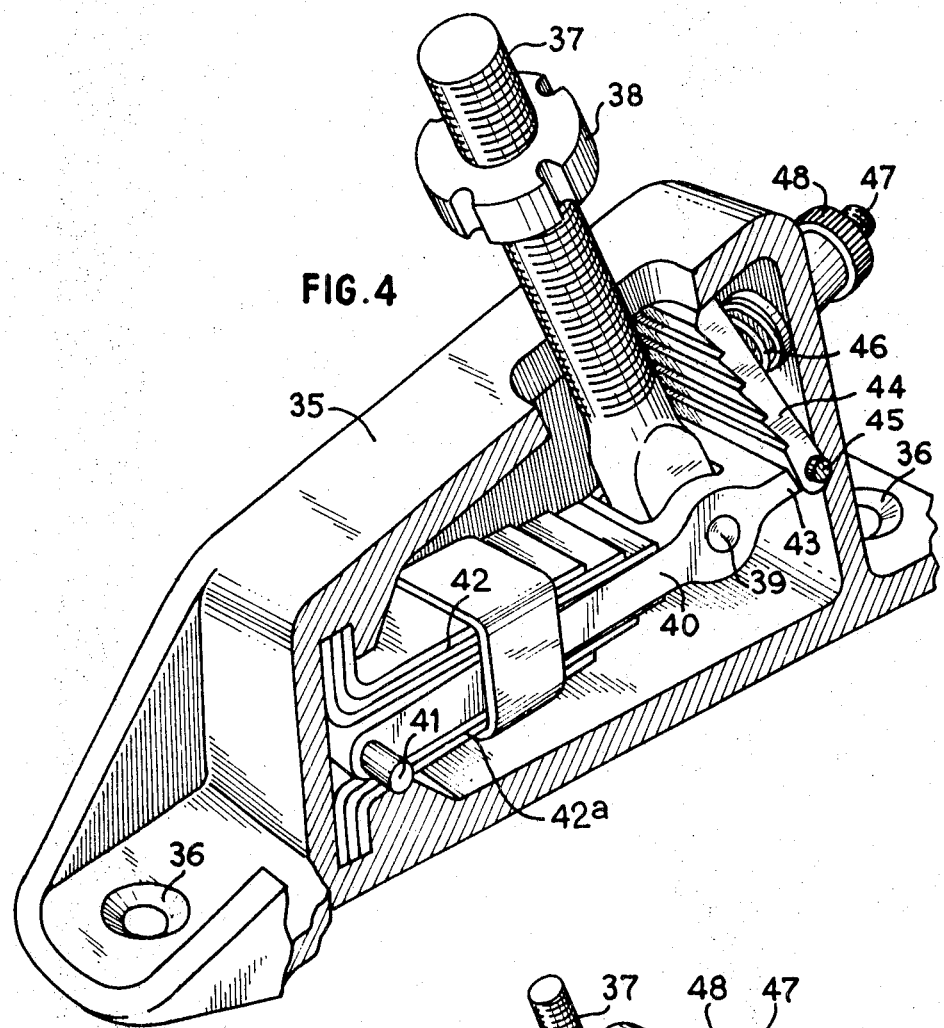
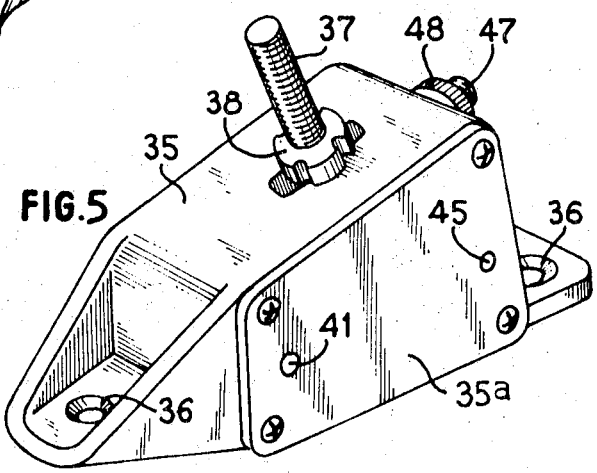

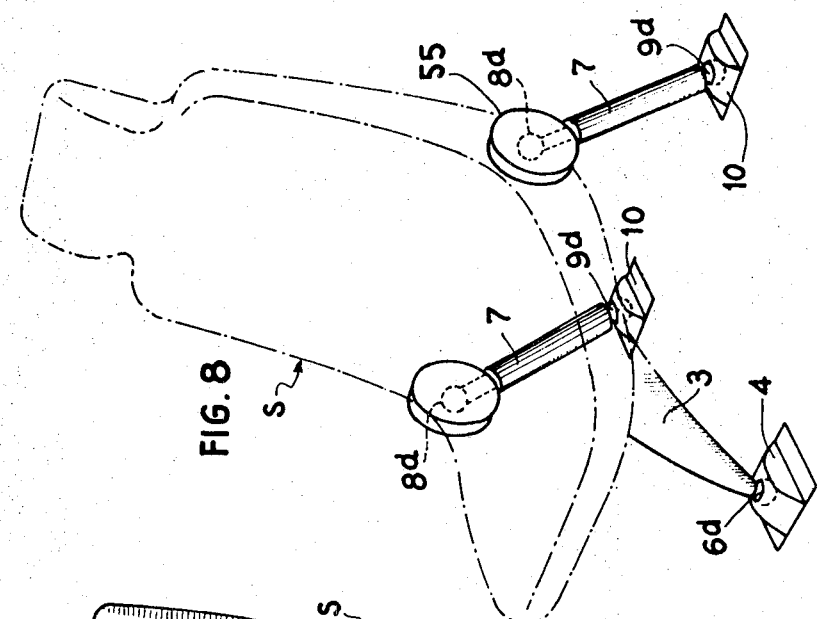
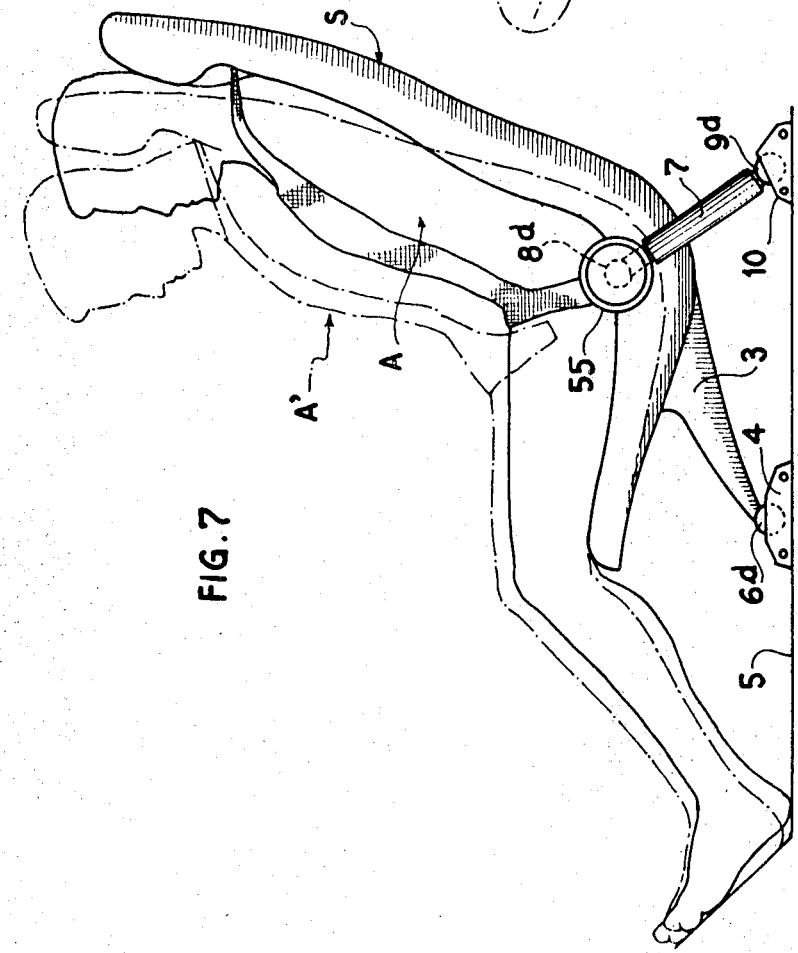

3,582,133

ENERGY ABSORBING ARRANGEMENT FOR SEAT ON A VEHICLE

The present invention relates to seats of vehicles and more particularly to the arrangement thereof for the purpose of absorbing energy.

It is known that when a user of an automobile vehicle is attached to his seat by belts or safety clothing fixed to the seat itself, an additional device must also be provided which is capable of absorbing the kinetic energy in the case of shock, at the moment of impact.

The object of the invention is to provide a very effective solution to this problem. The invention provides an arrangement of a seat on a vehicle wherein the seat is fixed to the vehicle by a pivotal connection allowing it to pivot and by at least one deformable device which absorbs energy upon deformation, said device being arranged to dissipate the maximum amount of energy in its dynamic phase without subsequent restoration of energy, which would be capable of shifting the passenger back again at a speed equal to the speed at the moment of impact.

Further features and advantages of the invention will be apparent from the ensuing description with reference to the accompanying drawings.

In the drawings:

FIG. 2 is a perspective view, with a part cut away, of one embodiment of the energy absorbing device;

FIG. 3 is a perspective view, with a part cut away, of a first modification of said device;

FIG. 4 is a perspective view, with a part cut away, of a second modification of the energy absorbing device;

FIG. 5 is a perspective view, on a reduced scale, of the device shown in FIG. 4;

FIG. 7 is a side elevational view of another seat assembly arranged in accordance with the invention;

FIG. 8 is a diagrammatic perspective view showing more clearly the various pivotal connections of the seat shown in FIG. 7;

Figure 1:
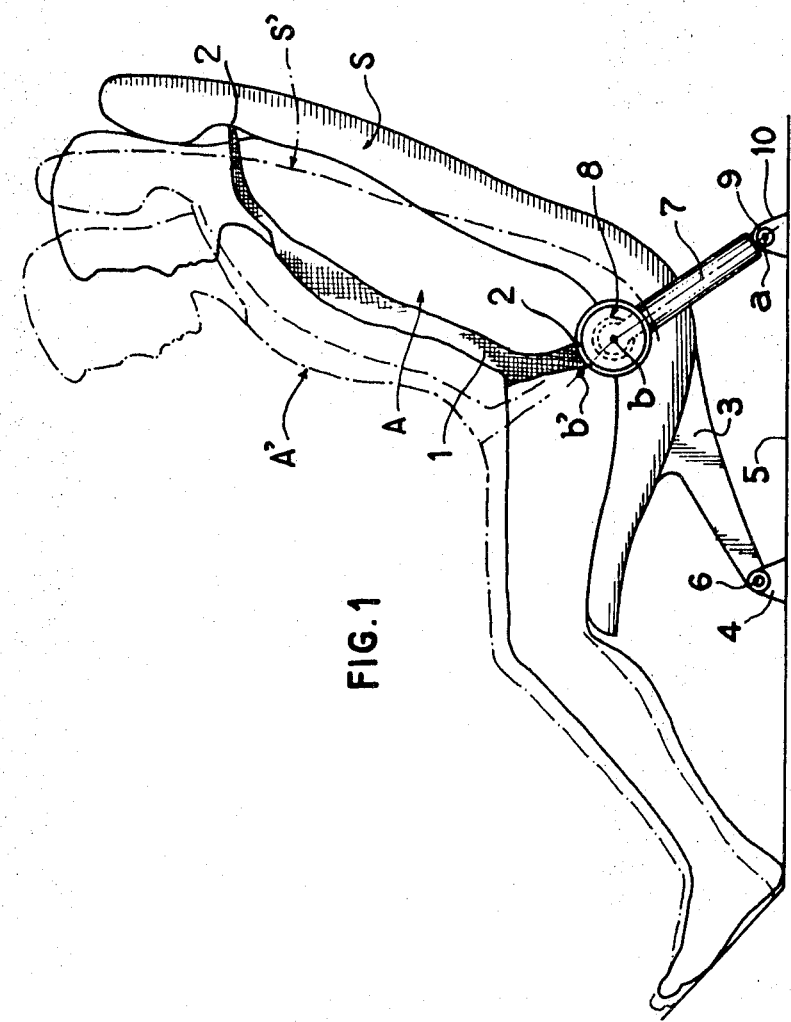
FIG. 1 is side elevational view of a seat arranged in accordance with the invention.

With reference to FIG. 1, which shows a passenger A seated on his seat S to which he is secured by a safety jacket or plastron 1 which is fixed to said seat at 2 by suitable means.

The front foot 3 of the seat is fixed on a support 4 integral with the floor 5 of the vehicle by a transverse pin 6.

The seat is held in position at the rear by two shock-absorbing devices 7 located on each side of the seat and fixed by transverse pins 8 to the frame of the seat and by transverse pins 9 to two supports 10 integral with the floor of the vehicle.

Upon impact, the seat S pivots about the pin 6 and reaches the position shown in dot-dash line at S' the passenger being urged forwardly to A'.

The devices 7 extend from $a-b$ to $a-b'$ and absorb the energy. They are so arranged that they do not restore this energy. Subsequent to the impact, the seat remains at the position S'.

FIG. 2 shows an embodiment of the energy absorbing device which comprises two telescopic cylinders 20 and 21 one of which is connected to the support 10 at its end $13^a$ whereas the other is connected to the seat at its end $17^a$. Located inside the cylinders is a metal rod forming successive spires and fixed respectively at 23 and 24 to the ends of the cylinders.

In this case, it is the permanent crushing of the various spires of the rod which produces the desired effect. The rod 22 must be replaced after its operation.

FIG. 3 shows another embodiment comprising an outer cylinder 25 terminating in its upper part in an end member $16^b$ for pivotal connection to the seat and in its lower part in a screw-threaded plug 26 having a passage for a rod 27 which terminates in its lower part in an end portion $13^b$ for securing to the floor. Located inside the cylinder 25 is a second corrugated cylinder 28 of sheet metal or plastics material the base of which bears against the plug 26 and the top of which supports the traction of the rod 27 exerted through a nut 29, screwed on the screw-threaded end of the rod 27, and a washer 30. The rod 27 comprises steps or teeth 31 which cooperate with a pawl 32 which is pivoted to the plug 25 at 33 and biased by a spring 24 which opposes any return movement of the rod 27 after an axial displacement thereof resulting in an elastic or plastic deformation of the corrugated cylinder 28.

It is this deformation which absorbs the kinetic energy. After operation the cylinder 28, which is axially crushed to a variable extent, must be replaced.

In order to achieve a gradual increase in the resistant force in the course of crushing, it is advantageous to arrange that the corrugations of the cylinder 28 have a pitch which increases in the downward direction in the case of a metal cylinder, or to arrange that the cylinder have a variable thickness which is combined or not combined with a variation in the pitch in the case of a cylinder of plastics material.

Instead of the aforementioned devices, it is also possible to use a device employing the upsetting of lead or like materials or a device employing a radial compression, with no axial reaction, of an elastomer or any other suitable material. An example thereof will be described hereinafter.

FIGS. 4 and 5 show an indestructible device which can be used again after operation. It comprises a housing 35 fixed to the floor by screws extending through apertures 36. A rod 37, fixed to the seat by its upper screw-threaded part provided with a nut 38 outside the housing 35, is pivoted at its lower end at 39 in this housing to a lever 40 which is pivoted by journals 41 to the housing 35 and to a lateral cover $35^a$ (FIG. 5). The lever 40 is moreover maintained between two stacks of leaf springs or spring strips 42 and $42^a$, the deformation of which results in the required absorption of the energy.

In order to prevent the rearward return, due to the reaction of these springs, the end 43 of the lever 40 is retained by the steps of the plate 44 which is pivoted at 45 to the housing and biased forwardly by a spring 46 and provided with a rod 47. This rod extends freely through an aperture in one of the lateral walls of the housing and is screw threaded and carries outside the housing an adjusting nut 48.

After operation of the device it can be returned to its initial position in the following manner. The nut 38 is screwed against the housing 35 so as to overcome the reaction or extension force of the springs 42 and $42^a$, the plate 44 is shifted back by screwing the nut 48 on the rod 47 connected to the plate 44 until the lever 40 is disengaged, the nut 38 is then gradually unscrewed until the lever 40 has returned to its initial position and lastly the nut 48 is unscrewed so as to return the plate 44 to a position suitable for retaining the end 43 of the lever 40 on one of its steps.

Figure 6:
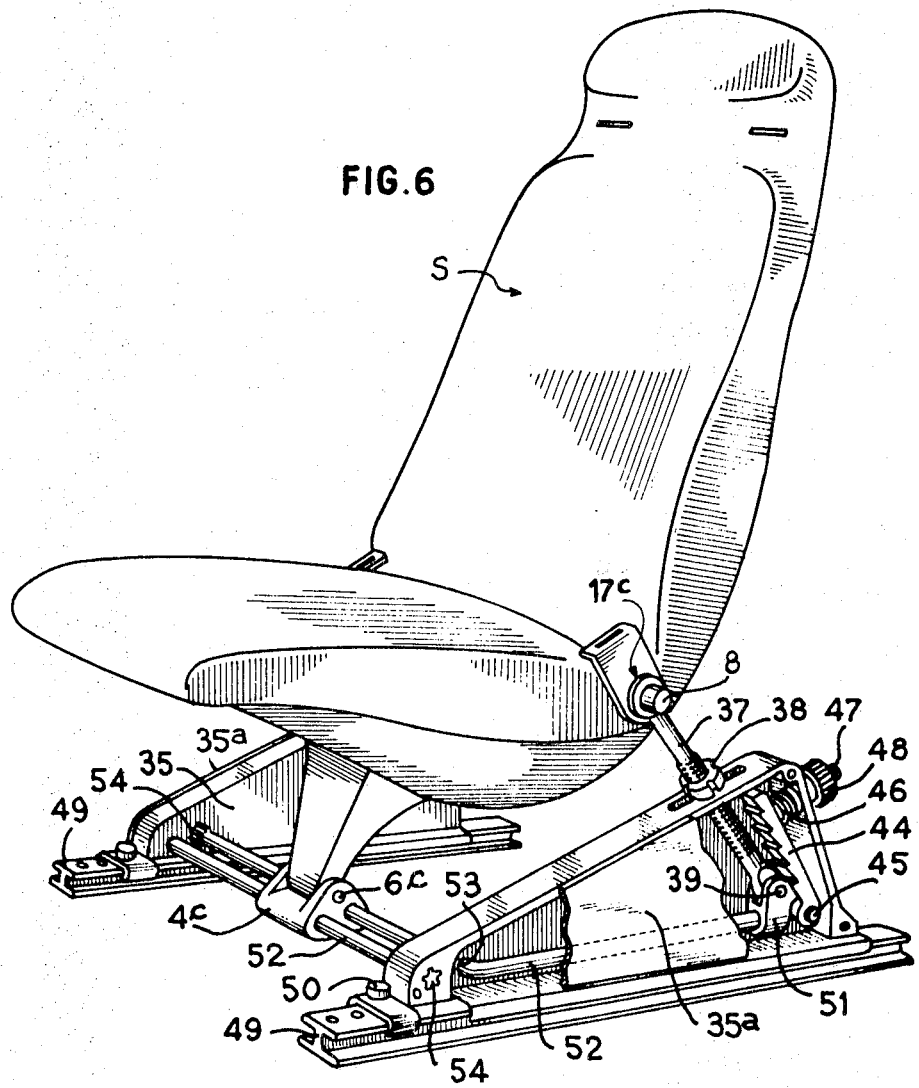
FIG. 6 is a perspective view of a seat assembly arranged in accordance with another embodiment.

FIG. 6 shows another embodiment of the arrangement of the seat which is provided on each side with two indestructible energy absorbing devices. These devices operate in a manner identical to the preceding device. Each of them comprises a housing 35 which is adjustable in position on a slideway 49 integral with the floor of the vehicle, the housing being fixed in position by a screw 50. A rod 37 is pivoted at its upper end 17ᶜ by a pin 8 to the rear of the seat and at its lower end at 39 to a sleeve 51. The latter is fixed to a bar 52 which extends toward the front of the seat where it is bent at right angles. The transverse branch of this bar 52 freely extends through the wall of the housing 35. A notched or square portion of the bar 52 is inserted at 53 in the opposite housing which also comprises an identical bar 52 which is inserted at 54 in the first-mentioned housing 35.

The front foot of the seat is pivoted at 6ᶜ to a support 4ᶜ fixed on the transverse portions of the two bars 52. In this example, the energy is absorbed by the torsion of said transverse portions of the bars 52, the position at the end of the absorption of energy being maintained owing to the action of the stepped member 44. After operation, the return to the initial position of the device is achieved as in the preceding embodiment by successive actions on the nuts 38 and 48.

In order to improve the efficiency of the arrangement in the event that the impact does not occur exactly in the longitudinal direction of the vehicle, the front part of the seat can be secured to the vehicle by a joint pivotable in any direction, the or each device capable of deforming with absorption of energy also being connected to the seat and to the vehicle by this kind of joint. Such an arrangement allows the seat to pivot about an axis which can make any angle with the axis of the vehicle so that the arrangement is effective in all cases of impact, whether the latter is exerted from the front or elsewhere.

FIGS. 7 and 8 show such an arrangement. The front foot 3 of the seat S is secured to a support 4 integral with the floor 5 of the vehicle by a joint 6ᵈ which is pivotable in any direction and consists of a ball and socket in the presently described embodiment. Likewise, at the rear of the seat, the two shock absorbing devices 7 on each side of the seat proper are secured by ball and socket joints 8ᵈ at one end to the frame of the seat, where the ball is hidden by a fitting 55, and by ball and socket joints 9ᵈ at the other end to two supports 10 integral with the floor of the vehicle. The two devices 7, which can of course be of any of the types described hereinbefore, comprise at their ends two end portions which constitute the male part of ball and socket joints.

The stability of the seat will be better understood with reference to FIG. 8. In the case of normal utilization, all the elements which interconnect the various ball and socket joints 6ᵈ, 8ᵈ, 9ᵈ have fixed lengths so that the assembly comprising the seat S and the energy absorbing devices 7 is rigid. It can only be deformed if the length of the devices 7 varies, that is, in the event of a violent shock.

In the event of impact from the front, the two devices 7 are deformed in an identical manner.

On the other hand, if the resultant of the forces of inertia developed in the course of a shock make an angle with the longitudinal axis of the vehicle, the two devices 7 deform in a different manner so that the tilting movement of the seat occurs about an axis intersecting the center of the front ball and socket joint 6ᵈ and perpendicular to said resultant of the forces of inertia.

In this way, the forces of inertia produced by the shock are absorbed with maximum effect irrespective of the point of impact on the vehicle.

An embodiment has been shown in which the joints employed in the arrangement of the seat are ball and socket joints, but it is clear that these ball and socket joints could be replaced by devices having the same characteristics, for example universal or like joints.

In the embodiments described hereinbefore, the pivotal connection to the floor is in the front of the seat and the energy absorbing devices are at the rear, but it must be understood that the invention also covers the opposite arrangement in which the seat is connected to the floor of the vehicle by a rear pivotal connection and by at least one energy absorbing device disposed in the front of the seat.

The advantage of this modification is that in the course of a shock it holds the passenger stationary while braking the passenger over a longer travel, mainly at the level of the head, without danger of the passenger striking a rigid part such as the wind shield. In this way, the deceleration in the case of brutal shocks can be limited to values which are still acceptable without too much harm to the individual.

Figure 9:
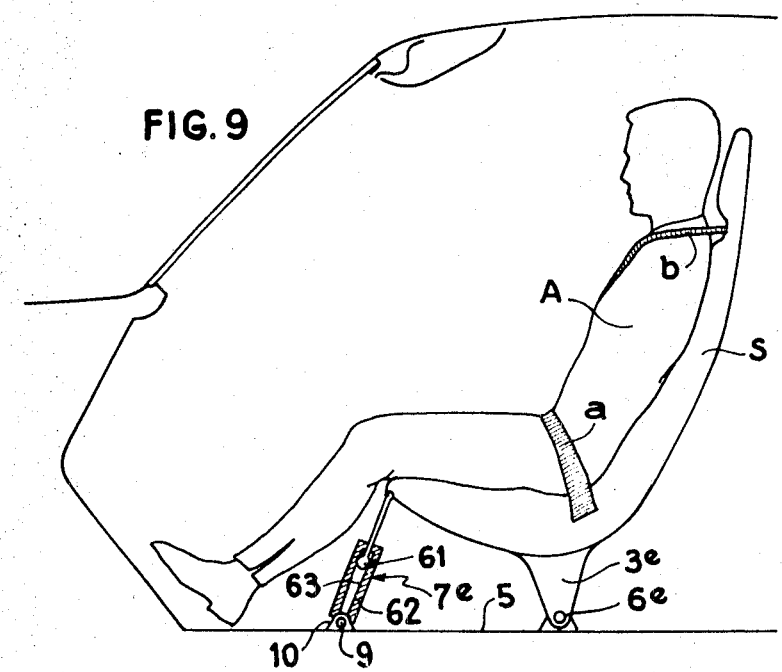
FIG. 9 is a longitudinal partial diagrammatic sectional view of a vehicle showing another seat arranged in accordance with the invention in the normal position, the passenger being seated on this seat.

FIG. 9 shows a seat S to which the passenger A is secured by a belt $a$ and/or a harness $b$, this seat being mainly supported by a rear foot 3ᵉ fixed to the floor 5 of the vehicle by a pivotal connection 6ᵉ.

The front part of the seat is connected to the floor through at least one energy absorbing device 7ᵉ which is pivoted at 9 to a fork 10 fixed to the floor 5.

Figure 13:
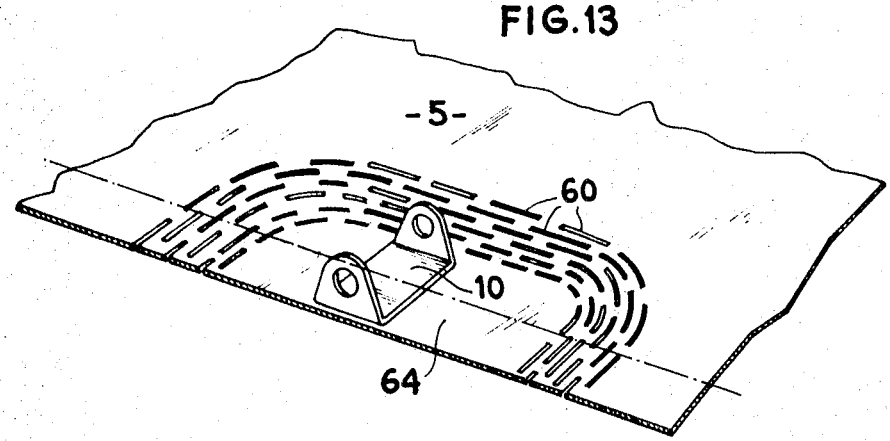
FIG. 13 is a partial perspective view of the floor of the vehicle in the region of the fixing point of a front energy absorbing device.

Preferably, the fork 10 is fixed to the center of a zone 64 of the floor 5 in which (FIG. 13) the sheet of metal of this floor is precut so as to form arcuate openings or slots 60 which are disposed in staggered relation on concentric lines.

Further, according to a preferred embodiment, the energy absorbing device 7ᵉ comprises a biconical knob 61 which transversely compresses as it travels along, that is locally, a sleeve 62 of an elastically yieldable material, such as an elastomer and in particular a mouldable or injectable polyurethane, the elastic reaction having axial resultant which is zero or at any rate negligible.

Preferably, the aperture 63 formed in the sleeve has a constant diameter or is slightly convergent from the starting position of the knob 61 and on each side of the latter so that the absorbing device is operative in both directions and is effective for shocks in either the front or the rear of the vehicle.

Figure 10:
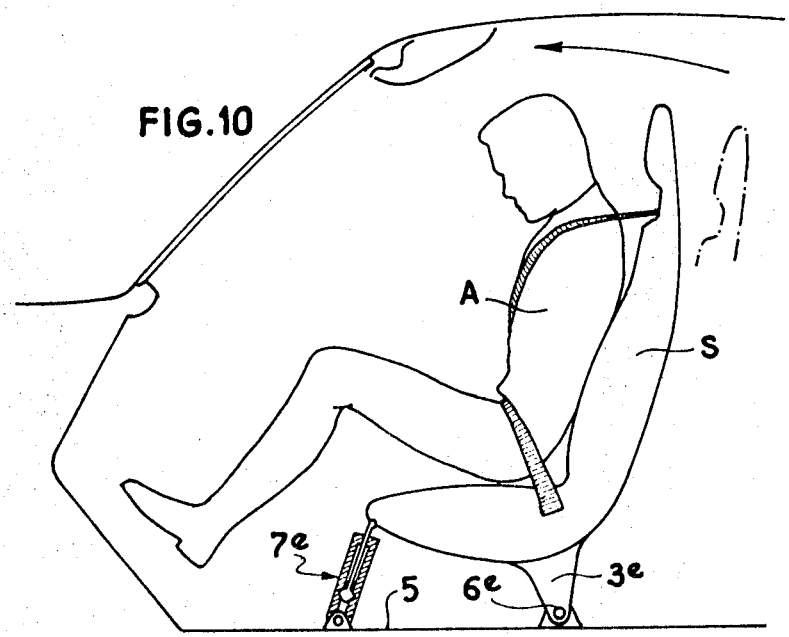
FIG. 10 is a view similar to FIG. 9 showing the seat and passenger after a heavy shock in the direction from the front of the vehicle.

FIG. 10 shows the position assumed by the seat S and its passenger or occupier A in the event of a front shock of such intensity that only the device 7ᵉ comes into operation.

Figure 11:
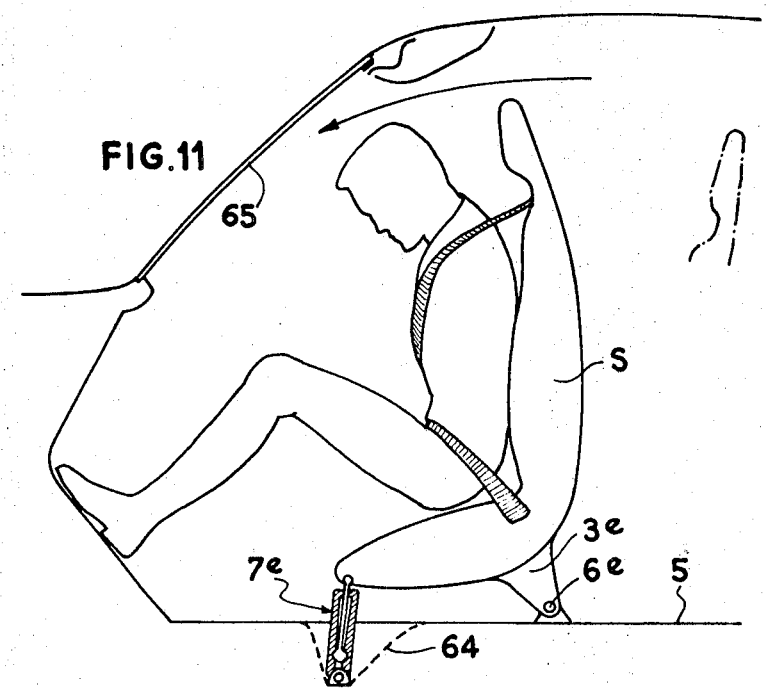
FIG. 11 is a view similar to FIG. 9 after an even heavier shock.
Figure 14:
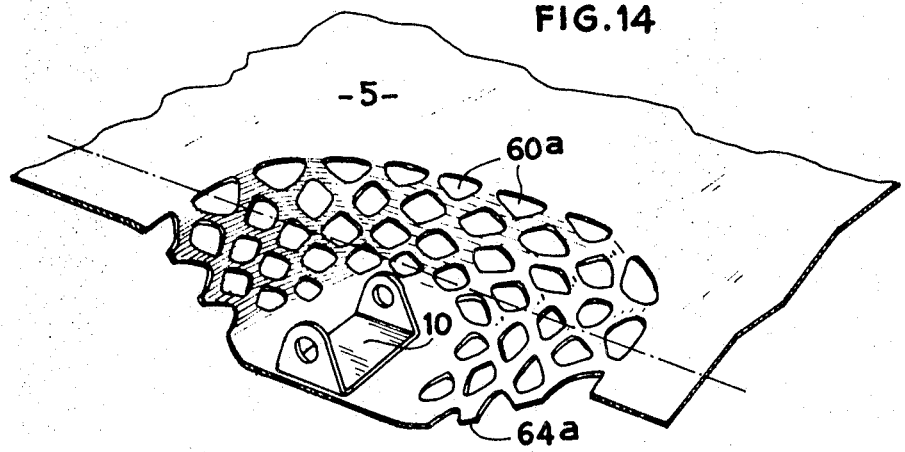
FIG. 14 is a view similar to FIG. 12 after deformation.

FIG. 11 shows the case in which the shock was particularly brutal, the device 7ᵉ having reached the end of its travel without having absorbed all of the kinetic energy of the assembly comprising the seat and the occupier. In this case, the deformation of the floor 5 to the position at 64ᵃ in the region of the device 7ᵉ permits—owing to the nonelastic deformation of sheet metal, the slots 60 opening as shown at 60ᵃ (FIG. 14)—dissipating additional energy while affording an additional travel before the final stoppage.

A comparison of FIGS. 9 and 11 shows that the rotation of the assembly about the pivotal connection 6ᵉ allows the head of the occupier to travel through a long distance with no danger of striking the windshield 65, which diminishes the deceleration at its level.

Figure 12:
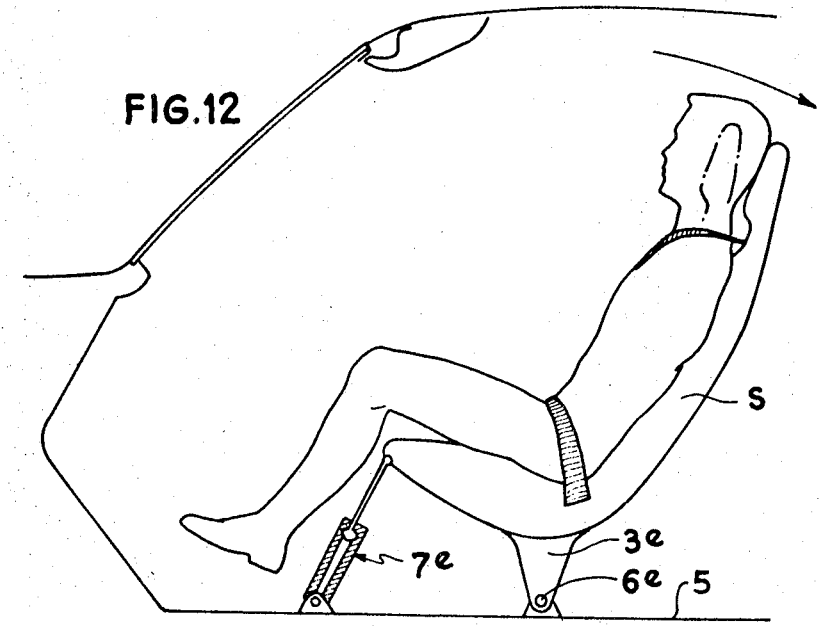
FIG. 12 is a view similar to FIG. 9 after a shock in the direction from the rear of the vehicle.

FIG. 12 shows the position assumed by the assembly of the seat and occupier after a shock at the rear of the vehicle. In this case, the device 7ᵉ is subjected to tensile forces.

Although specific embodiments of the invention have been described, many modifications and changes may be made therein without departing from the scope of the invention as defined in the appended claims.

In particular, each of the described devices can be mounted on adjusting slideways which are capable of resisting the forces due to deceleration, as indicated in respect of the embodiment shown in FIG. 6.

I claim:

1. An arrangement comprising a vehicle having a floor, a seat in spaced relation to said floor, a single foot mounted on the seat and a pivotal connection connecting the foot to the floor and allowing the seat to pivot relative to the floor upon impact on the vehicle, and two deformable energy absorbing devices which absorb energy upon deformation connecting the seat to the vehicle floor at points spaced from said pivotal connection, the energy absorbing devices being adapted and arranged to dissipate energy in a dynamic phase without subsequent restoration of the energy which would be liable to throw the passenger using the seat back at a speed substantially equal to the speed at the moment of impact on the vehicle.

2. An arrangement as claimed in claim 1, comprising two absorbing devices arranged in parallel.

3. An arrangement as claimed in claim 1, wherein each absorbing device comprises two telescopic elements having means connecting them to the vehicle floor and seat respectively, and at least one deformable means deformable with absorption of energy disposed in such manner that it is deformed when the two elements undergo a relative displacement from positions they occupy in a normal position of the seat.

4. An arrangement as claimed in claim 3, wherein the two telescopic elements are interconnected by a deformable rod comprising spires, said telescopic elements being tubular and encompassing said rod.

5. An arrangement as claimed in claim 3, wherein one of the telescopic elements is a rigid cylinder and the other a rod, a crushable corrugated cylinder being interposed between the rod and the rigid cylinder.

6. An arrangement as claimed in claim 5, wherein said rod is notched and cooperates with a pawl carried by said rigid cylinder for maintaining the device in position when the corrugated cylinder is in a crushed condition.

7. An arrangement as claimed in claim 1, wherein each energy absorbing device comprises, in combination, a housing, a lever pivoted to the housing, elastically yieldable means maintaining the lever in an operative position in which the device is ready for energy absorbing operation, a rod pivoted to the lever and connected to the seat, and a retaining element cooperative with the lever and connected to the housing for preventing the lever from pivoting back after having pivoted in opposition to the reaction of the elastically yieldable means and absorbed energy.

8. An arrangement as claimed in claim 7, wherein the retaining element comprises teeth means and the lever has a free end engaged with the teeth means, the free end and the teeth means being adapted to allow the lever to pivot in the direction for absorbing energy but to prevent the lever from pivoting in the opposite direction.

9. An arrangement as claimed in claim 7, wherein the retaining element is withdrawable.

10. An arrangement as claimed in claim 7, wherein said elastically yieldable means are spring strip means.

11. An arrangement as claimed in claim 7, wherein said elastically yieldable means are torsion bars.

12. An arrangement as claimed in claim 1, wherein said single foot is located adjacent a front part of the seat and said absorbing devices are located adjacent a rear part of the seat.

13. An arrangement as claimed in claim 12, comprising pivot pins extending transversely of the seat for the deformable devices and the pivotal connection of the foot.

14. An arrangement as claimed in claim 12, wherein said pivotal connection is capable of pivoting in any direction, the absorbing devices being also connected to the seat and to the vehicle by pivotal connections capable of pivoting in any direction.

15. An arrangement as claimed in claim 14, wherein said pivotal connections are ball and socket joints.

16. An arrangement as claimed in claim 14, wherein said pivotal connections are universal joints.

17. An arrangement as claimed in claim 1, wherein the seat is connected to the floor of the vehicle by a foot located adjacent a rear part of the seat and by two energy absorbing devices disposed adjacent a front part of the seat.

18. An arrangement as claimed in claim 1, wherein said floor has two nonelastically deformable zones, the energy absorbing devices being fixed to substantially the center of said zones, whereby said zones absorb additional energy when the energy absorbing device has absorbed maximum energy.

19. An arrangement as claimed in claim 18, wherein said zones of the floor have openings disposed on lines substantially concentric with the point at which each absorbing device is fixed to the corresponding zone.